United States Patent Office 3,282,784
Patented Nov. 1, 1966

3,282,784
HYPOGLYCEMIC COMPOSITIONS AND METHODS OF DITHIODIACETIC ACID DERIVATIVES
Samuel Gordon, Pearl River, and Herman Westley Levin, Spring Valley, N.Y., assignors to American Cyanamid Company, Stamford, Conn., a corporation of Maine
No Drawing. Filed Apr. 26, 1963, Ser. No. 276,063
10 Claims. (Cl. 167—65)

This application is a continuation-in-part of our application Serial No. 260,310, filed February 21, 1963, now abandoned.

This invention relates to new compositions of matter for the control of hyperglycemia. More particularly, it relates to therapeutic compositions containing dithiodiacetic acid or a lower alkyl ester thereof, or mixtures of these, which operate to induce hypoglycemia in mammals. The invention includes the new compositions of matter and methods of controlling hyperglycemia therewith.

Heretofore, the control of diabetes has been generally accomplished by the parenteral administration of insulin. However, the necessity of frequent injections of insulin has been one of the major objections to its use. More recently, oral hypoglycemic agents have been introduced because of their ease of administration. However, the effect of most of these is of short duration and consequently frequent dosing is required.

Our invention is based upon the discovery that dithiodiacetic acid and its mono-and di-lower alkyl esters are orally effective in lowering the blood sugar over a prolonged period of time. The high potency and prolonged action of these compounds, as well as their ready absorbance from the gastro-intestinal tract, would indicate them to be useful for the treatment of diabetes. Dithiodiacetic acid and the lower alkyl esters thereof, the active ingredients of the novel compositions of the present invention, may be represented by the following general formula:

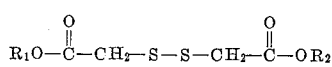

wherein $R_1$ and $R_2$ are each hydrogen or lower alkyl. The lower alkyl groups contemplated by the present invention are those having from 1 to 4 carbon atoms, with methyl and ethyl being preferred. Dithiodiacetic acid and the mono- and di-lower alkyl esters thereof may be readily prepared by methods well known to the art.

It is not known how dithiodiacetic acid and the lower alkyl esters thereof of the present invention operate to induce hypoglycemia in mammals and no theory of why these compounds so operate is advanced. It is not intended that the present invention should be limited to any theory as to mechanism.

The method of administering the active ingredients of the novel compositions of the present invention is limited to oral administration. They may be so administered either individually or as mixtures of a plurality of such active ingredients. They may be orally administered, for example, with an inert diluent or with an assimilable edible carrier, or they may be enclosed in hard or soft gelatin capsules, or they may be compressed into tablets. It is an advantage of the present invention that dithiodiacetic acid and the lower alkyl esters thereof may be orally administered in any convenient manner.

The amount of a single dose or of a daily dose to be given will vary with the size of the individual to be treated, but should be such as to give a proportionate dosage of from about 2.5 mg. to about 25 mg. per kg. of body weight per day of dithiodiacetic acid or a lower alkyl ester thereof, or mixtures thereof. In terms of total weight of active ingredient, this is usually from about 0.1 g. to about 2.0 g. per daily dosage. This dosage regimen may be adjusted to provide the optimum therapeutic response; for example, several divided doses may be administered daily or the dose may be proportionately reduced as indicated by the exigencies of the therapeutic situation.

The following examples illustrate the hypoglycemic effect of the novel compositions of the present invention and the method of administering them.

*Example 1.—Hypoglycemic activity of dithiodiacetic acid in normal rats*

Normal, male Sherman strain rats of approximately 140 gms. weight were fasted overnight and used the following morning. The compound was administered orally by gavage (stomach tube) as a suspension in 0.5% carboxymethyl cellulose solution. One hundred mg. of compound was suspended in 4 ml. of carboxymethyl cellulose solution and appropriate volumes administered for various doses. Blood was removed from the animals' respective tails at various intervals, and analyzed for glucose on the Technicon Auto Analyzer®. Appropriate standards and controls were analyzed also for comparison. The response to various levels of the compound is shown in Table I below:

TABLE I.—ORAL DOSE RESPONSE TO VARIOUS LEVELS OF DITHIODIACETIC ACID IN THE RAT

| Dose,[1] mg./kg. | Mg. percent Blood glucose at— | |
|---|---|---|
| | 2 hrs. | 4 hrs. |
| 500 | [2] 84.6±7.2 | 38.6±5.6 |
| 250 | 86.0±5.0 | 40.5±3.1 |
| 125 | 98.3±10.2 | 46.0±7.5 |
| 62.5 | 101.2±1.0 | 63.6±8.5 |
| Control | 92.5±1.1 | 92.5±2.7 |

[1] Three animals per group.
[2] Mean ± standard error of the mean.

The results of a time study showing the prolonged action of this compound is shown in Table II below:

TABLE II.—PROLONGED ORAL ACTION OF DITHIODIACETIC ACID AT 250 MG./KG. IN THE RAT

Time:                                   Blood Glucose, mg. percent
  2 hrs. ------------------------------ [3] 77±13.6
  4 hrs. ------------------------------ 43±5.5
  7 hrs. ------------------------------ 20±0

[3] Mean ± standard error of the mean.

*Example 2.—Hypoglycemic activity of the dimethyl ester of dithiodiacetic acid in normal rats*

Experimental procedure as in Example 1.

RESULTS

| Dose | Mg. percent Blood Glucose at— | |
|---|---|---|
| | 2 hrs. | 4 hrs. |
| 100 mg./kg. | 48 | 24 |
| I.p. | 44 | 24 |
| Control | | 63 |

*Example 3.—Hypoglycemic activity of the diethyl ester of dithiodiacetic acid in normal rats*

Experimental procedure as in Example 1.

RESULTS

| Dose | Mg. percent Blood Glucose at— | |
|---|---|---|
| | 2 hrs. | 4 hrs. |
| 250 mg./kg. | 44 | 36 |
| I.p. | 52 | 32 |
| Control | | 71 |

What is claimed is:

1. A therapeutic composition in oral dosage unit form useful for the control of hyperglycemia comprising from 0.1 gram to 2.0 grams per daily dosage unit of compounds of the formula:

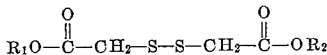

wherein $R_1$ and $R_2$ are each selected from the group consisting of hydrogen and lower alkyl, and an edible carrier.

2. A therapeutic composition in oral dosage unit form useful for the control of hyperglycemia comprising from 0.1 gram to 2.0 grams per daily dosage unit of dithiodiacetic acid, and an edible carrier.

3. A therapeutic composition in oral dosage unit form useful for the control of hyperglycemia comprising from 0.1 gram to 2.0 grams per daily dosage unit of dithiodiacetic acid monomethyl ester, and an edible carrier.

4. A therapeutic composition in oral dosage unit form useful for the control of hyperglycemia comprising from 0.1 gram to 2.0 grams per daily dosage unit of dithiodiacetic acid dimethyl ester, and an edible carrier.

5. A therapeutic composition in oral dosage unit form useful for the control of hyperglycemia comprising from 0.1 gram to 2.0 grams per daily dosage unit of dithiodiacetic acid monoethyl ester, and an edible carrier.

6. A therapeutic composition in oral dosage unit form useful for the control of hyperglycemia comprising from 0.1 gram to 2.0 grams per daily dosage unit of dithiodiacetic acid diethyl ester, and an edible carrier.

7. The method of inducing hypoglycemia which comprises administering orally to a mammal in whom a hypoglycemic effect is desired an amount ranging from 2.5 mg. to 25 mg. per kilogram of body weight per day of compounds of the formula:

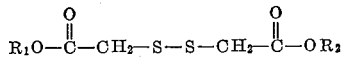

wherein $R_1$ and $R_2$ are each selected from the group consisting of hydrogen and lower alkyl.

8. The method of inducing hypoglycemia which comprises administering orally to a mammal in whom a hypoglycemic effect is desired an amount ranging from 2.5 mg. to 25 mg. per kilogram of body weight per day of dithiodiacetic acid.

9. The method of inducing hypoglycemia which comprises administering orally to a mammal in whom a hypoglycemic effect is desired an amount ranging from 2.5 mg. to 25 mg. per kilogram of body weight per day of dithiodiacetic acid dimethyl ester.

10. The method of inducing hypoglycemia which comprises administering orally to a mammal in whom a hypoglycemic effect is desired an amount ranging from 2.5 mg. to 25 mg. per kilogram of body weight per day of dithiodiacetic acid diethyl ester.

References Cited by the Examiner

Chemical Abstracts, vol. 55, p. 16415h (1961), L. Guczi et al.

Chemical Abstracts, vol. 55, p. 16395a (1961), J. Daneby et al., J. Am. Chem. Soc. 83, p. 1109.

JULIAN S. LEVITT, *Primary Examiner.*

FRANK CACCIAPAGLIA, JR., *Examiner.*

MARTIN J. COHEN, *Assistant Examiner.*